(12) United States Patent  
Ozaki (10) Patent No.: US 8,526,019 B2  
(45) Date of Patent: Sep. 3, 2013

(54) INFORMATION PROCESSING APPARATUS, METHOD FOR INFORMATION PROCESSING, AND STORAGE MEDIUM

(75) Inventor: Hiroshi Ozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1062 days.

(21) Appl. No.: 12/260,745

(22) Filed: Oct. 29, 2008

(65) Prior Publication Data

US 2009/0109481 A1 Apr. 30, 2009

(30) Foreign Application Priority Data

Oct. 31, 2007 (JP) ................................. 2007-283543

(51) Int. Cl.
| G06K 15/02 | (2006.01) |
| G06F 3/038 | (2013.01) |
| G06F 15/00 | (2006.01) |
| H04N 1/00 | (2006.01) |

(52) U.S. Cl.
USPC ........... 358/1.13; 358/1.1; 358/2.1; 358/1.15; 358/1.16; 358/501; 358/401; 719/327

(58) Field of Classification Search
USPC .......................... 358/2.1, 1.13, 1.15, 501, 401
See application file for complete search history.

(56) References Cited

U.S. PATENT DOCUMENTS

| 6,804,019 B2 * | 10/2004 | Shiohara ........................ 358/1.15 |
| 6,957,437 B1 * | 10/2005 | Bogia et al. .................... 719/327 |
| 7,213,060 B2 * | 5/2007 | Kemp et al .................... 709/222 |
| 7,284,246 B2 * | 10/2007 | Kemp et al. ................... 719/321 |
| 7,886,185 B1 * | 2/2011 | Okcu et al. .................... 719/328 |
| 7,908,609 B2 * | 3/2011 | Mitsui ........................... 719/321 |
| 2002/0030852 A1 * | 3/2002 | Matsuo ......................... 358/1.15 |
| 2003/0046268 A1 * | 3/2003 | Hirabayashi ..................... 707/1 |
| 2003/0053106 A1 * | 3/2003 | Kuroda et al. ................. 358/1.13 |
| 2003/0093768 A1 * | 5/2003 | Suzuki .......................... 717/100 |
| 2004/0093491 A1 * | 5/2004 | Ebata ............................ 713/100 |
| 2004/0190052 A1 * | 9/2004 | Sando .......................... 358/1.15 |
| 2004/0267973 A1 * | 12/2004 | Sumida et al. ................... 710/8 |
| 2005/0012951 A1 * | 1/2005 | Madril et al. ................. 358/1.13 |
| 2005/0128501 A1 * | 6/2005 | Choi et al. .................... 358/1.13 |
| 2005/0198650 A1 * | 9/2005 | Ford et al. ..................... 719/321 |
| 2005/0200873 A1 * | 9/2005 | Yamakawa et al. ........... 358/1.13 |
| 2006/0017951 A1 * | 1/2006 | Tanaka ......................... 358/1.13 |
| 2007/0216943 A1 * | 9/2007 | Funamizu ..................... 358/1.15 |
| 2007/0273919 A1 * | 11/2007 | Oomura ....................... 358/1.15 |
| 2008/0077914 A1 * | 3/2008 | Sando .......................... 717/174 |

FOREIGN PATENT DOCUMENTS

JP 2003-271340 9/2003

\* cited by examiner

*Primary Examiner* — King Poon  
*Assistant Examiner* — Beniyam Menberu  
(74) *Attorney, Agent, or Firm* — Canon U.S.A., Inc. IP Division (57) ABSTRACT

An information processing apparatus includes a storage unit configured to store shared printer drivers classified into a plurality of product categories each including one or more printing apparatuses, and correspondence information between the shared printer drivers and the printing apparatuses, an acquisition unit configured to acquire product specifying information for specifying a printing apparatus from among the printing apparatuses, a determination unit configured to determine a shared printer driver corresponding to a product category corresponding to the product specifying information acquired by the acquisition unit based on the correspondence information stored in the storage unit, even if the shared printer driver is not included in the correspondence information, a setup unit configured to perform setup using the shared printer driver determined by the determination unit.

11 Claims, 8 Drawing Sheets

| SHARED PRINTER DRIVER NAME EXAMPLE | SFP BASIC FUNCTIONS | MFP BASIC FUNCTIONS | COLOR BASIC FUNCTIONS | MONOCHROME BASIC FUNCTIONS | STAPLE FUNCTION | BINDING FUNCTION | SECURITY FUNCTION | COMMAND LEVEL |
|---|---|---|---|---|---|---|---|---|
| MONOCHROME SFP SHARED PRINTER DRIVER | ○ | — | — | ○ | — | — | — | 1,2 |
| COLOR SFP SHARED PRINTER DRIVER | ○ | — | ○ | — | — | — | — | 2 |
| MONOCHROME MFP SHARED PRINTER DRIVER | — | ○ | — | ○ | ○ | — | ○ | 2 |
| MONOCHROME MFP POD SHARED PRINTER DRIVER | — | ○ | — | ○ | ○ | ○ | ○ | 2 |
| COLOR MFP SHARED PRINTER DRIVER | — | ○ | ○ | — | ○ | — | ○ | 2 |
| COLOR MFP POD SHARED PRINTER DRIVER | — | ○ | ○ | — | ○ | ○ | ○ | 2 |

| PRODUCT IDENTIFICATION 6001 | 6002 | MONO/COLOR 6003 | FINISHING 6004 | SECURITY LEVEL 6005 | COMMAND LEVEL 6006 | DRIVER TYPE 6007 |
|---|---|---|---|---|---|---|
| SFP1000 | SFP | MONO | NO | Sec0 | LEVEL1 | DriverA |
| SFP1100 | SFP | MONO | NO | Sec0 | LEVEL1 | DriverA |
| SFP2000 | SFP | MONO | Staple | Sec0 | LEVEL2 | DriverA |
| ... | ... | ... | ... | ... | ... | ... |
| SFPC3000 | SFP | COLOR | NO | Sec0 | LEVEL2 | DriverB |
| SFPC3050 | SFP | COLOR | NO | Sec0 | LEVEL2 | DriverB |
| ... | ... | ... | ... | ... | ... | ... |
| MFP5000 | MFP | MONO | Staple | Sec1 | LEVEL2 | DriverC |
| MFP6000 | MFP | MONO | Binder | Sec1 | LEVEL2 | DriverD |
| ... | ... | ... | ... | ... | ... | ... |
| MFPC3000 | MFP | COLOR | NO | Sec1 | LEVEL2 | DriverE |
| MFPC3500 | MFP | COLOR | Staple | Sec1 | LEVEL2 | DriverF |
| ... | ... | ... | ... | ... | ... | ... |

```
LIPS4 Printer Driver - SETUP WIZARD                                    [X]
THE FOLLOWING SHARED PRINTER DRIVER HAS BEEN ASSIGNED
AS A RESULT OF THE AUTOMATIC SEARCH.
TO CHANGE THE SHARED PRINTER DRIVER, CLICK ON
THE "CHANGE" BUTTON.
```

ASSIGNED SHARED PRINTER DRIVER

705

PRINTER LIST(L):  [CHANGE(S)] [SEARCH AGAIN(R)]

|  | PRODUCT NAME | ASSIGNED SHARED PRINTER DRIVER |
|---|---|---|
| 701 — CONFIRMED | SFP2000 | MONOCHROME SFP SHARED PRINTER DRIVER |
| 702 — CONFIRMED | MFP5000 | MONOCHROME MFP SHARED PRINTER DRIVER |
| 703 — CONFIRMED | MFPC3000 | COLOR MFP SHARED PRINTER DRIVER |
| 704 — ESTIMATED | MFPC3050 | COLOR MFP SHARED PRINTER DRIVER |

☐ SET PRINTER INFORMATION(T):

[<BACK(B)] [NEXT(N)>] [CANCEL]

FIG.8

INFORMATION PROCESSING APPARATUS, METHOD FOR INFORMATION PROCESSING, AND STORAGE MEDIUM

BACKGROUND OF THE INVENTION

1. Field of the Invention

The present invention relates to a printing system including a printing apparatus and an information processing apparatus equipped with a printer driver which is used when sending data to the printing apparatus for printing.

2. Description of the Related Art

Examples of a software program for performing printing processing in a printing apparatus, such as a printer, based on an application running on an operating system (OS) include a software program which is called a "printer driver". With such a printer driver, various print mode settings can be made, such as selection of the paper feed cassette, setting of the color processing method, and selection of the paper ejection method according to the configuration of the printing apparatus. Since the printer driver realizes the functions of the printing apparatus, a printer driver specific to each product is prepared. Further, because the printing scheme is different depending on the type of OS, a printer driver is prepared for each OS.

Further, in Japanese Patent Application Laid-Open No. 2003-271340, a method in which all or part of a printer driver is transferred from the printing apparatus to the computer side is discussed.

SUMMARY OF THE INVENTION

According to an aspect of the present invention, an information processing apparatus includes a storage unit configured to store shared printer drivers classified into a plurality of product categories each including one or more printing apparatuses, and correspondence information between the shared printer drivers and the printing apparatuses, an acquisition unit configured to acquire product specifying information for specifying a printing apparatus from among the printing apparatuses, a determination unit configured to determine a shared printer driver corresponding to a product category corresponding to the product specifying information acquired by the acquisition unit based on the correspondence information stored in the storage unit, even if the shared printer driver is not included in the correspondence information, and a setup unit configured to perform setup using the shared printer driver determined by the determination unit.

According to an exemplary embodiment of the present invention, a maintainability of printer drivers can be improved upon the release of new products.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
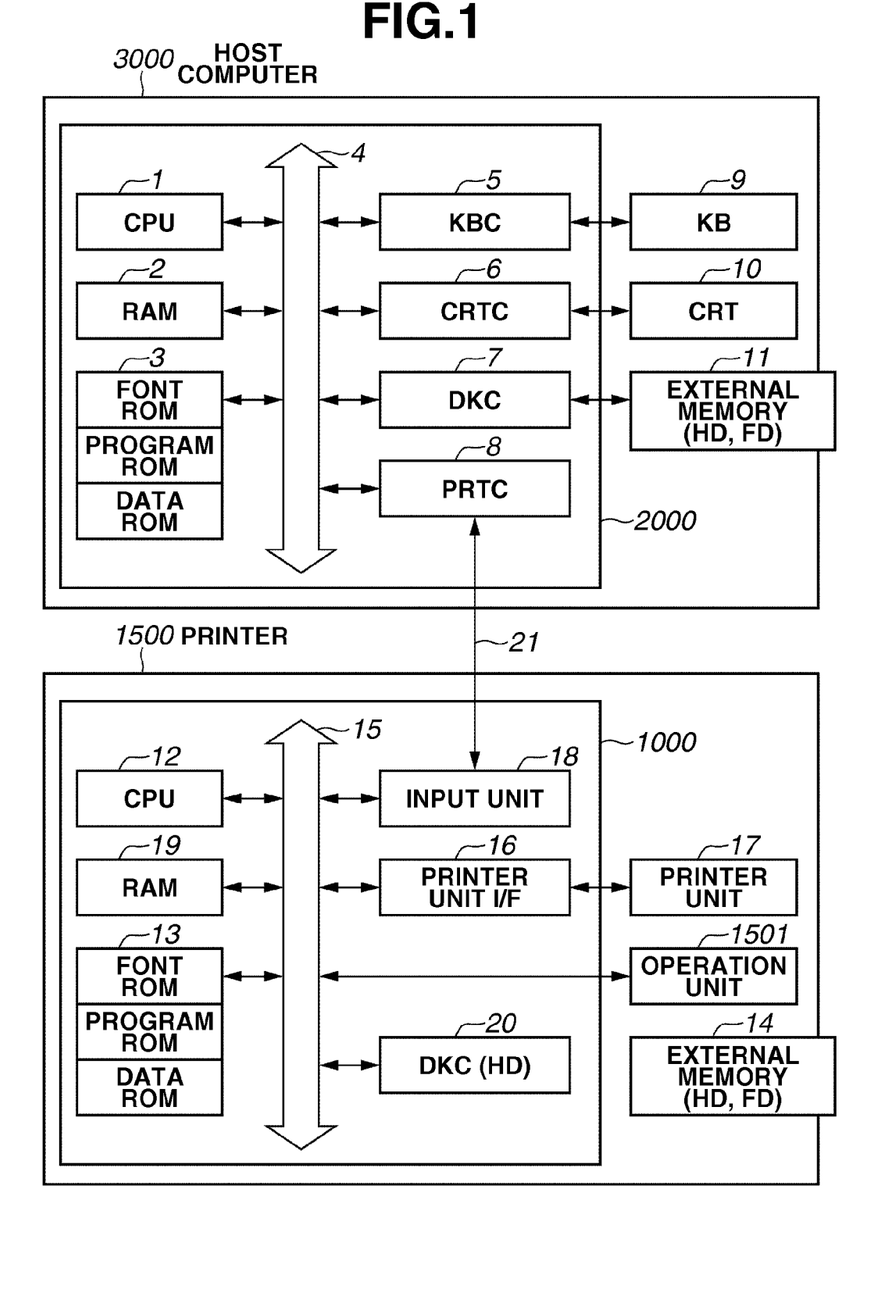
FIG. 1 is a block diagram illustrating a configuration of the printing system according to an exemplary embodiment of the present invention.

FIG. 1 is a block diagram illustrating a configuration of the printing system according to an exemplary embodiment of the present invention. It is noted that unless stated otherwise, as long as the functions of the present invention are executed, the present invention can be applied in a system which includes a single or a plurality of devices, or in a system in which processing is performed via a network, such as a local area network (LAN) or a wide area network (WAN), connected to the system.

In FIG. 1, a host computer 3000 includes a central processing unit (CPU) 1 which executes document processing in which graphics, images, characters, tables (including spreadsheets, etc.) and the like are intermingled, using a document processing program or the like which is stored in a program read-only memory (ROM) of a ROM 3 or in an external memory 11. The CPU 1 performs total control over each of the devices connected to a system bus 4. Further, an operating system program (hereinafter, referred to as "OS"), which is a control program of the CPU 1, is stored in the program ROM of the ROM 3 or the external memory 11. Font data used during the above document processing is stored in a font ROM of the ROM 3 or in the external memory 11. Various types of data used during the above document processing are stored in a data ROM of the ROM 3 or in the external memory 11. A random access memory (RAM) 2 functions as a main memory or a work area of the CPU 1. A keyboard controller (KBC) 5 controls key input from a keyboard 9 and a pointing device (not illustrated). A cathode ray tube controller (CRTC) 6 controls the display on a CRT display (CRT) 10. A disk controller (DKC) 7 controls access to the external memory 11, which stores a boot program, various applications, font data, user files, editing files, a printer control command generation program (hereinafter, referred to as a "printer driver") and the like. The external memory 11 can be a hard disk (HD), a floppy disk (FD) or the like. A printer controller (PRTC) 8 is connected to a printer 1500 via a given bidirectional interface (interface) 21 for executing communication control processing with the printer 1500. The CPU 1 executes rasterize processing of the outline font to the display information RAM set in the RAM 2, for example, to enable "What You See Is What You Get" (WYSIWYG) on the CRT 10. Further, the CPU 1 opens various registered windows based on a command instructed by a mouse cursor (not illustrated) or the like on the CRT 10, and executes various types of data processing. When a user executes printing, the window relating to the printing settings is opened, so that the printer settings and the printing processing method settings for the printer driver including the selection of the printing mode can be performed.

In the printer 1500, a printer CPU 12 runs based on a control program which is stored in a program ROM of a ROM 13, or in an external memory 14. As a result, an image signal is output as output information to a printer unit (printer engine) 17 that is connected to a system bus 15 via a printer unit interface 16. Further, a control program for the printer CPU 12 is stored in the program ROM of the ROM 13. Further, font data used when generating the above output information is stored in a font ROM of the ROM 13. For a printer without an external memory 14, such as a hard disk, the information used in the host computer 3000 is stored in a data ROM of the ROM 13. The CPU 12 can perform communication processing with the host computer 3000 via an input unit 18, and can notify the host computer 3000 of information in the printer 1500. A RAM 19 functions as a main memory or work area for the CPU 12. The RAM 19 is configured so that its memory capacity can be expanded using optional RAM connected to an expansion port (not illustrated). The RAM 19 is used in an output information rasterizing region, an environment data storage region, a nonvolatile random access memory (NVRAM) and the like. Access to the external memory 14, such as a hard disk (HD) and an integrated circuit card (IC card), is controlled by a memory controller (MC) 20. The external memory 14 is optionally connected for storing font data, an emulation program, form data and the like. Further, the input unit 18 is provided with switches and an LED display device etc., for operation of an operation unit 1501. Further, the external memory is not limited to one, and at least one or more memories can be included. The external memory can be configured so that a plurality of external memories storing optional font cards in addition to the built-in fonts and programs for interpreting printer control languages of different language types can be connected. In addition, the external memory can have a NVRAM (not illustrated) for storing the printer mode setting information received from the operation unit 1501.

Figure 2:
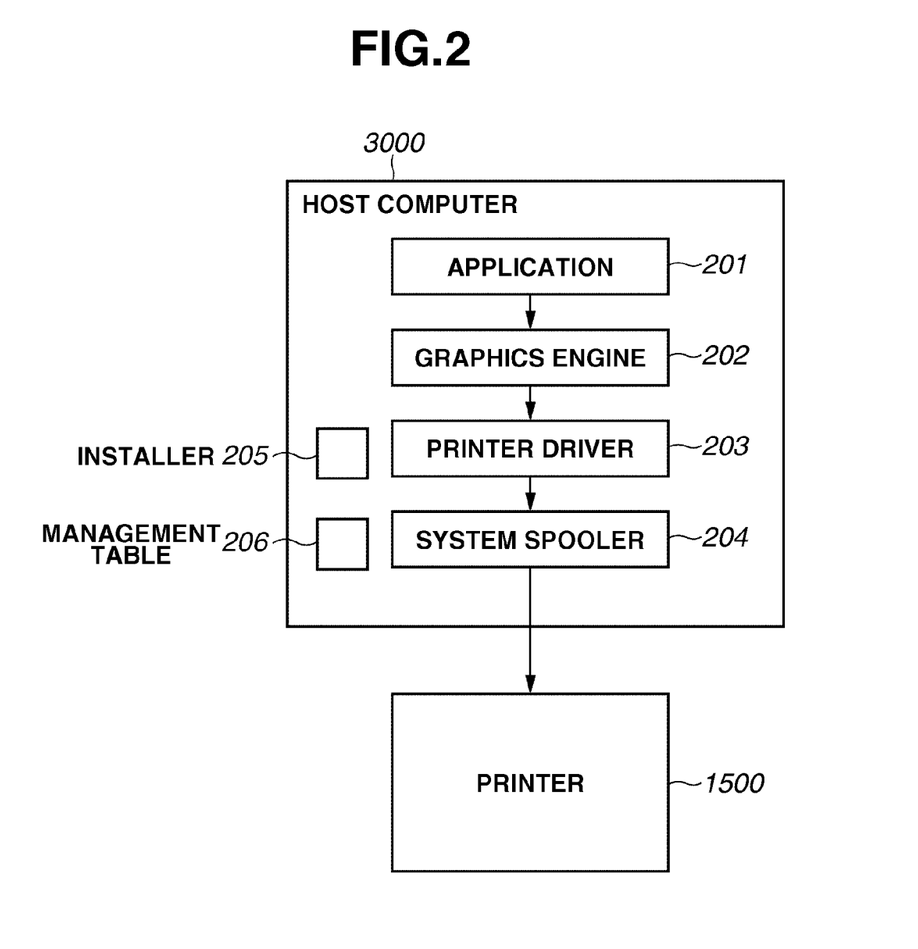
FIG. 2 is a block diagram illustrating a configuration for generating print data in a host computer.

FIG. 2 is a block diagram for the typical printing processing in a host computer 3000 to which a printing apparatus, such as a printer, is directly connected or connected via a network. An application 201, a graphics engine 202, a printer driver 203, and a system spooler 204 are present as files stored in the external memory 11. When these files are executed, they are program modules that are loaded into the RAM 2 and executed by the OS or a module utilizing that module. The host computer 3000 also includes an installer 205, which has a function of installing the printer driver 203, and which executes the flow of FIG. 8. Further, the application 201 and the printer driver 203 can be added to an external memory 11 (FD), a CD-ROM (not illustrated), or an external memory 11 (HD) via a network (not illustrated). The application 201 stored in the external memory 11 is loaded into the RAM 2 and executed. When performing printing on the printer 1500 instructed by the application 201, output (drawing) is performed using the graphics engine 202 which has similarly been loaded into the RAM 2 and made ready for execution. The graphics engine 202 similarly loads the printer driver 203, which was prepared for each printing apparatus, from the external memory 11 into the RAM 2. The graphics engine 202 converts the output of the application 201 into a printer control command using the printer driver 203. The converted printer control command is output to the printer 1500 via a system spooler 204, which has been loaded into the RAM 2 by the OS, and an interface 21. The host computer 3000 in FIG. 2 corresponds to that in FIG. 1. The printer 1500 is one example of a printing apparatus. The printer 1500 can be a printing apparatus of a category illustrated in the far-left column of FIG. 4, or some other printing apparatus. A plurality of printing apparatuses can be connected to the host computer. The installer 205 can display the screen illustrated in FIG. 7 on the CRT 10.

Figure 6:
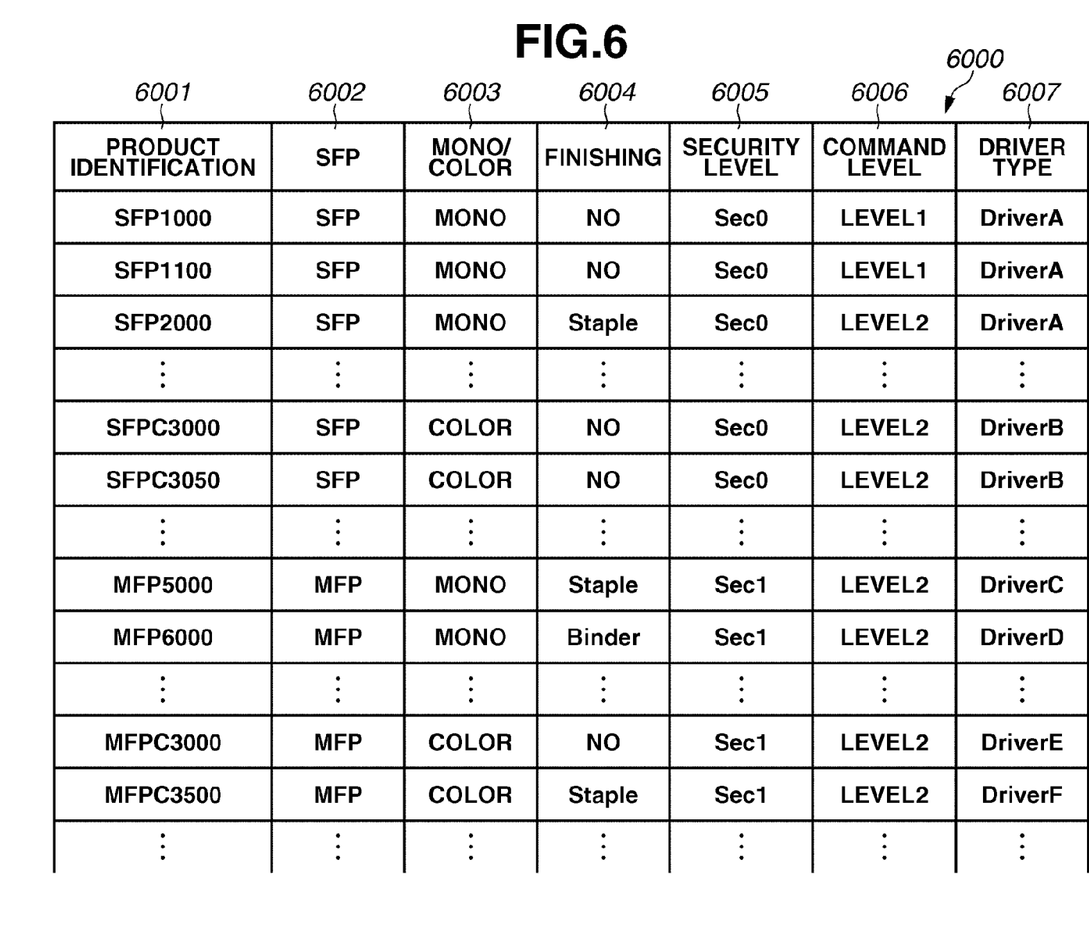
FIG. 6 is a management table illustrating an example of shared printer drivers corresponding to product specifying information.

A management table 206 corresponds to the table 6000 illustrated in FIG. 6.

Figure 3:
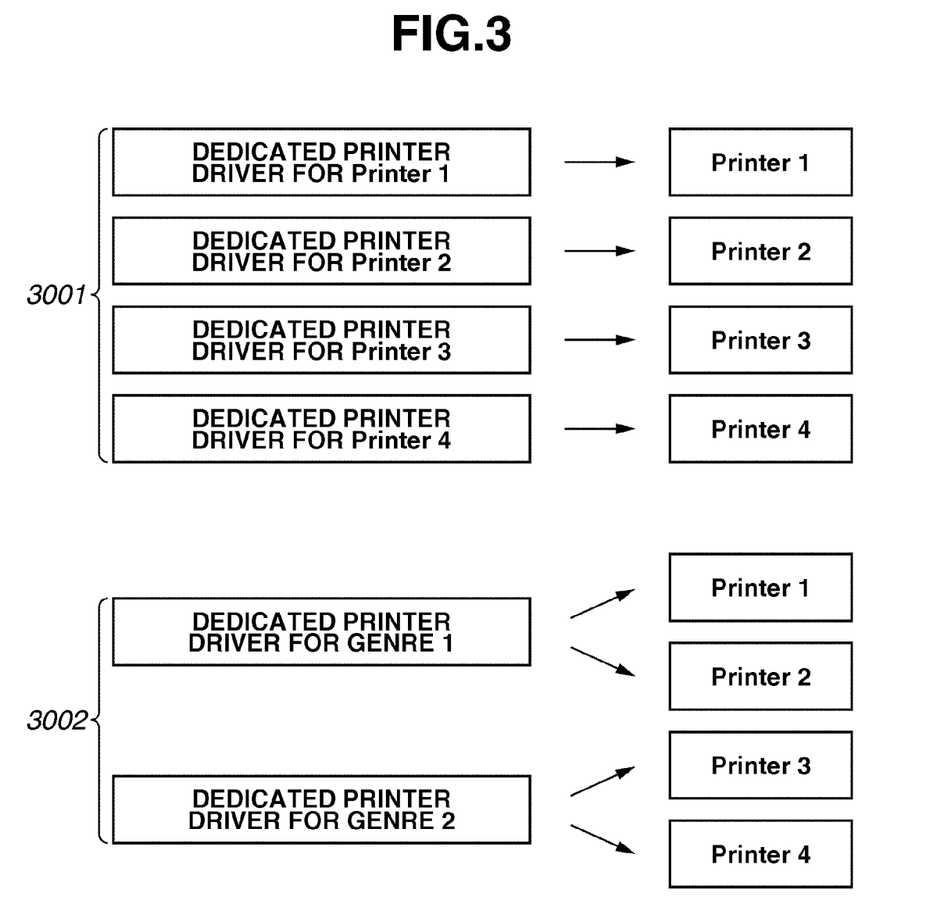
FIG. 3 is a relationship diagram illustrating the relationship between printer drivers and printing apparatuses.

Next, the relationship between a typical printer driver and a printing apparatus is illustrated in part 3001 of FIG. 3, and the relationship between the shared printer driver, which is prepared in advance in the present exemplary embodiment, and a printing apparatus is illustrated in part 3002 of FIG. 3. As illustrated in part 3001 of FIG. 3, it is intended to provide one dedicated printer driver for each printing apparatus. Such dedicated printer drivers realize a featured function of each product. Therefore, for other printing apparatuses, there were functions that the dedicated printer drivers could not realize. Thus, as illustrated in part 3002 of FIG. 3, if shared printer drivers, of which basic functions are classified into a plurality of genres, are prepared, the number of printer drivers to be provided in the market can be decreased.

Figure 4:
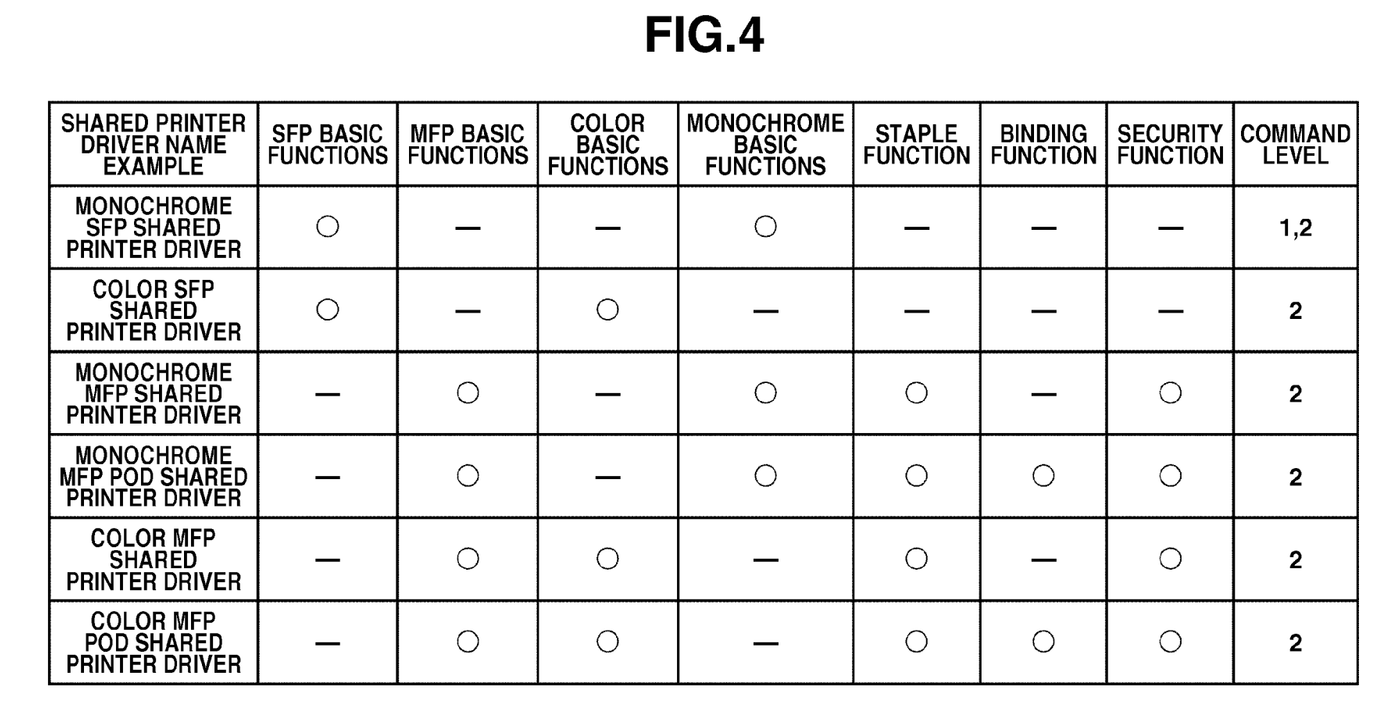
FIG. 4 is a table illustrating an example of shared printer driver sets prepared in advance.

FIG. 4 is a table in which the basic functions of a printing apparatus are extracted and classified into genres for determining what type of shared printer driver should be prepared.

For example, for a printing apparatus which has a color function, a color adjustment function and a matching setting function for color data are necessary. Further, for a printing apparatus for monochrome printing only, a gray scale setting function is necessary. Further, the functions respectively required are very different depending on whether a printing apparatus has only a staple function in a sorting apparatus or a printing apparatus has functions capable of performing as far as binding. In addition, for a printing apparatus equipped with a security function, such as department management, a dedicated user interface (UI) and a scheme for realizing bidirectional authentication and the like are also necessary. Depending on the corresponding command level, there is a need for switching the commands to be output to the printing apparatus. The "command level" is, for example, the version of a job management protocol. Thus, for printing apparatuses with a variety of characteristics as described above, a universal driver might be able to deal with this considering such characteristics of the printing apparatuses. However, there is still a problem that it is difficult to design a printer driver UI which harnesses the characteristics thereof, based on the genre that the printing apparatus is classified into.

Accordingly, in the present exemplary embodiment, a plurality of shared printer drivers having the following characteristics are prepared in advance.

Driver A: For a Single Function Peripheral (SFP) monochrome printer with no security function. The UI changes depending on whether there is a staple function or not. The command level performs Level 1/Level 2 switch control. The Single Function Peripheral (SFP) includes a single-function printer. The driver name is "monochrome SFP shared printer driver".

Driver B: For an SFP color printer with no security function. The UI changes depending on whether there is a staple function or not. The driver name is "color SFP shared printer driver".

Driver C: For an Multi Function Peripheral (MFP) monochrome printer with a security function. It is equipped with a staple function. The driver name is "monochrome MFP shared printer driver". Examples include facsimiles, scanners, printers or a multifunction peripheral combining these.

Driver D: For an MFP monochrome printer with a security function. It is equipped with a Print On Demand (POD) function such as case binding. The driver name is "monochrome MFP POD shared printer driver".

Driver E: For an MFP color printer with a security function. It is equipped with a staple function. The driver name is "color MFP shared printer driver".

Driver F: For an MFP color printer with a security function. It is equipped with a POD function such as binding. The driver name is "color MFP POD shared printer driver".

While in the present exemplary embodiment the above-described printer drivers are prepared, the number of drivers can be decreased (i.e., by further sharing), or increased (i.e., by further classification).

Figure 5:
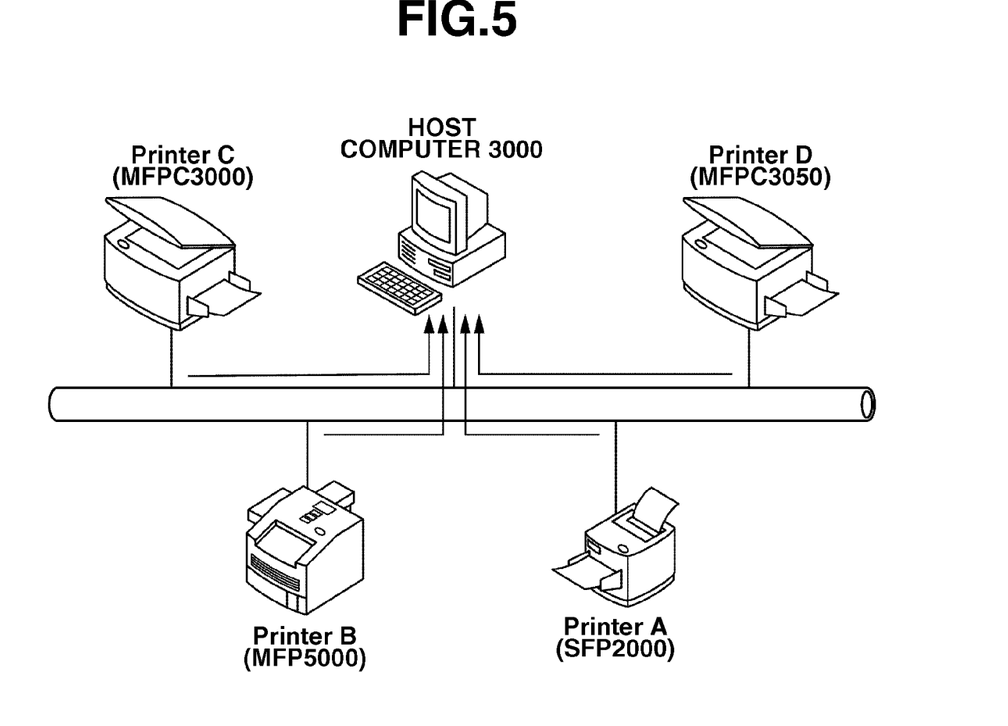
FIG. 5 is a connection diagram illustrating an example of connection between a host computer and printers according to an exemplary embodiment of the present invention.

FIG. 5 is a diagram illustrating a scheme for automatically searching for printing apparatuses connected to a network. In FIG. 5, a host computer 3000 in which the printer drivers are installed, and a plurality of printing apparatuses (Printer A, Printer B, Printer C, and Printer D) are connected to the network.

By selecting the automatic search function of the installer 205, Simple Network Management Protocol (SNMP) and printer Management Information Base (MIB) (defined by RFC 1759 as a standard) are used. In response to a broadcast from the host computer 3000, the installer 205 acquires MIB information from a subject printing apparatus. For example, information on the printing apparatuses connected to the network can be acquired by the installer 205 broadcasting to the printing apparatuses connected to the network. In addition, further information specific to a product can be acquired by using a private MIB.

As a result of the above operation, assume that the model name SFP2000 from Printer A, MFP5000 from Printer B, MFPC3000 from Printer C, and MFPC3050 from Printer D are acquired. In such a case, a method for installing the printer drivers will now be described. In the printer driver installer, the correspondence between product specifying information and the corresponding shared printer drivers is managed by a management table 6000 illustrated in FIG. 6. This management table 6000 lists information on a print single function peripheral (SFP), a print multifunction peripheral (MFP) having a copier function, a printer equipped with a color printing function, a printer equipped with a management function, a level equipped with a finishing function, corresponding command levels and the like. Further, from this table, it is estimated and determined which of the shared printer drivers prepared in advance is suitable. In the case of MFPC3550, Driver F is selected. This is because, even for the same color model, the lineup equipped with an optional function, such as a staple function, has a series number of 3500 or higher. This is also similar for other drivers. In this manner, the same driver can be installed for models that have a relatively similar name and a slightly higher identification number. The product specifying information can be any information from which the product and specifically the model can be specified. The product specifying information can be the device ID defined in IEEE 1284.4.

According to the information in the management table 6000 illustrated in FIG. 6, the following drivers are assigned (step S8004 in FIG. 8) to the printers.

Printer A: Driver A (monochrome SFP shared printer driver)
Printer B: Driver C (monochrome MFP shared printer driver)
Printer C: Driver E (color MFP shared printer driver)

Figure 7:
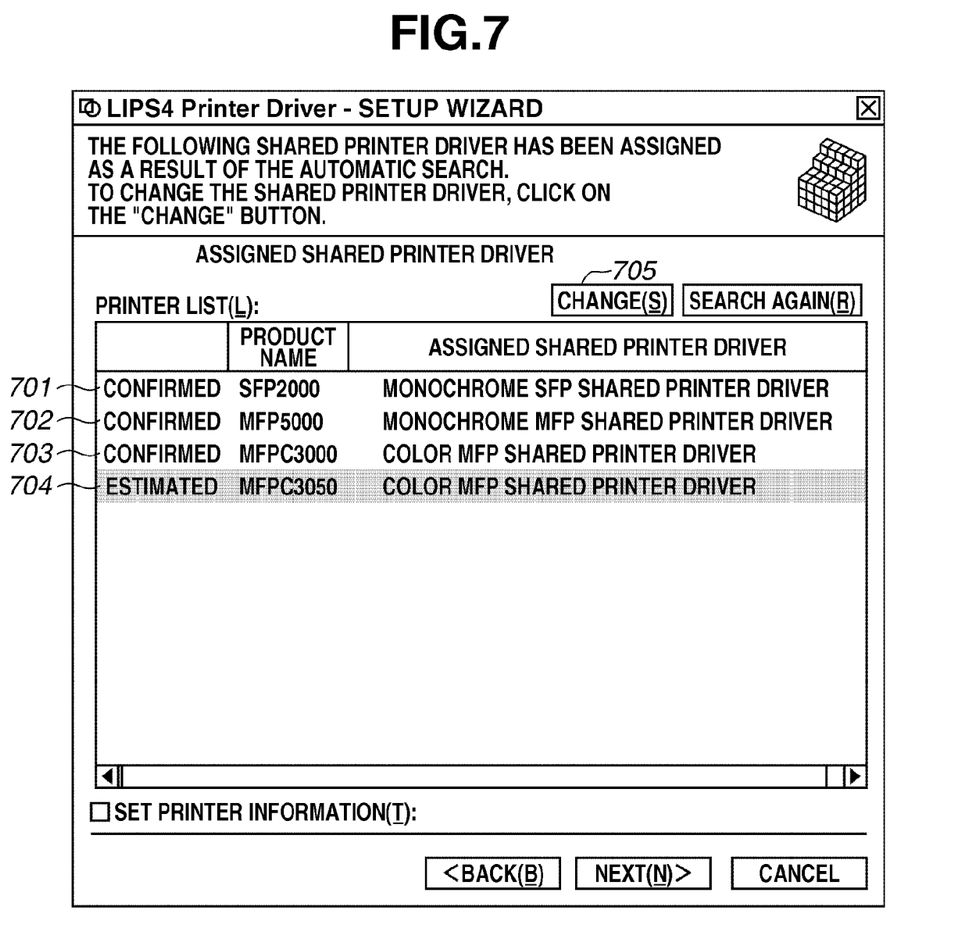
FIG. 7 is a diagram of a display illustrating an example of an automatic search for an installer and a result of shared printer driver assignment.
Figure 8:
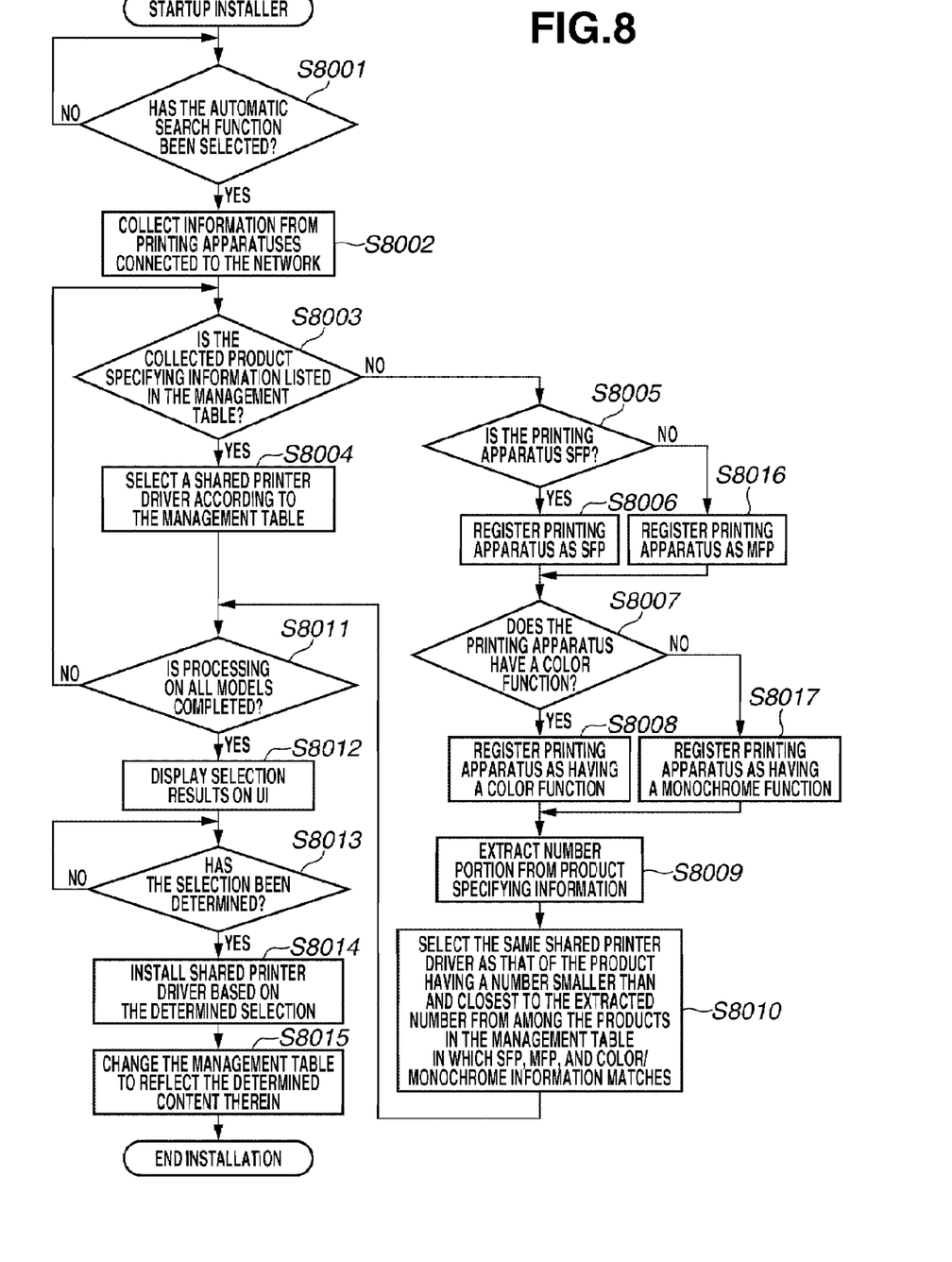
FIG. 8 is a control flow chart according to an exemplary embodiment of the present invention.

An UI example of the installer at that point is illustrated in FIG. 7. While FIG. 8 will be described below in detail, a brief description is given here. The result of Step S8003 of FIG. 8 is YES.

A contrasting case, for example, when the result of step S8003 is NO, will now be described. Since information regarding Printer D is not listed in the management table, the corresponding shared printer driver cannot be specified. The reason for this is that the printing apparatus was developed after the development of the shared printer driver.

Specifically, after a printer driver is developed and released, printers with various model names are released.

Conventionally, for printers with such model names, it was necessary to re-release the driver installer using an INF file in which the new model names are written. Obviously, unless the installer is re-released, there is no printer driver having corresponding names to the new printer names in the management table. However, the present invention makes it possible to respond more flexibly to such products that were developed after the printer driver was developed by using an estimation of the printer driver. As a result, it is no longer necessary to re-constitute the installer. Thus, the amount of printer driver maintenance work can be substantially decreased.

The method for specifying the shared printer driver for Printer D will now be described. As illustrated in FIG. 6, if all or part of the information listed in the management table based on the MIB information from Printer D could be acquired, and if the shared printer driver according to the management table 6000 in FIG. 6 could be specified, then the specified shared printer driver is used. If the shared printer driver could not be specified, estimation is made based on the obtained information. An example of the MIB basic information is product specifying information. The product specifying information can include the characters specifying SFP/MFP, color/monochrome, series number, and the like. The corresponding shared printer driver can sometimes be specified by detecting these characters. FIG. 7 illustrates a UI example of a shared printer driver installer when the estimated results in such a case are Printer D: Driver E (color MFP shared printer driver). Since printer drivers corresponding to products SFP2000, MFP5000, and MFPC3000 could be determined from the management table, the status is given as "confirmed" in lines 701 to 703. However, since the management table dose not list information for product MFPC3050, the status is given as "estimated" in line 704. Since the estimated results might not be correct, or estimation might not be possible, a user can change the shared printer driver by clicking on the "change" button 705. Although not illustrated, if the assigned shared printer driver was changed by the user, the status is changed to "confirmed". The "change" button 705 can also be displayed only when "estimated" in line 704 appears. Further, the "change" button 705 can be configured so that it can only be clicked on when "estimated" in line 704 was selected.

By providing feedback about the thus-confirmed shared printer driver information to the management table, from the next time the corresponding shared printer driver can be specified from the management table. Further, by allowing the management table to be directly edited or switched, the correct shared printer driver can always be installed without estimation. The management table is stored in area 206 of the host computer 3000 illustrated in FIG. 2, and is illustrated in detail in FIG. 6. In the management table, a printer driver that was registered by estimation can be registered in step S8015 that it only has an "estimated" status (not illustrated) As a result, even when the same installer is again executed, from the second time it will be understood that the printer driver was determined by estimation. FIG. 6 illustrates an example of the management table 6000.

The management table in FIG. 6 lists product identification information 6001, specifically, product specifying information, information 6002 representing whether a product is an SFP or an MFP, information 6003 represents whether the printing apparatus is monochrome or color, information 6004 representing whether the printing apparatus has a finishing function, and information 6005 representing the security level, for example, whether the printing apparatus has an encryption function or a department management function. Further, command level 6006 represents the version of the job management protocol, and information 6007 represents the driver type. The driver is determined based on the correspondence between the product specifying information 6001 and the driver type information 6007. As the correspondence information, just the information 6001 and 6007 can be sufficient.

The above-described series of processing will now be described in more detail according to the control flow of FIG. 8. The installer 205 executes the processing.

The processing illustrated in FIG. 8 starts when an installer 205 for a shared printer driver is instructed to start up. First, in step S8001, an automatic search function provided in the installer 205 waits for instruction. When the function is selected and instructed (YES in step S8001), then in step S8002, the installer 205 searches for printing apparatuses that are connected to the network, and receives printing apparatus information via the network. The collected printing apparatus information includes product specifying information, for example, the model name of the printing apparatus, for specifying a printing apparatus. In step S8003, the installer 205 determines whether the product information specified by the collected product specifying information is listed in the management table for the shared printer driver corresponding to the product specifying information. If such information is listed (YES in step S8003), then in step S8004, the installer 205 determines the shared printer driver according to the management table. Next, in step S8011, the installer 205 determines whether the processing on all the models has been completed.

If the product specifying information is not listed in the management table (NO in step S8003), the installer 205 performs an estimation in the following order based on shared printer driver estimation control by using the product specifying information obtained from the printing apparatus or other information. First, in step S8005, the installer 205 specifies whether the printing apparatus is an MFP or an SFP. For example, in the present exemplary embodiment, the installer 205 determines that a printing apparatus is an SFP if there is the character string "SFP" in the product specifying information, and determines that a printing apparatus is an MFP if there is the character string "MFP" in the product specifying information. Obviously, the determination can be made using some other character string, or based on some other information obtained from the printing apparatus. If the printing apparatus is determined to be an SFP (YES in step S8005), then in step S8006, the installer 205 temporarily registers the printing apparatus as an SFP. If the printing apparatus is determined to be an MFP (NO in step S8005), then in step S8016, the installer 205 temporarily registers the printing apparatus as an MFP. Next, in step S8007, the installer 205 determines whether the printing apparatus has a color function. In this determination as well, in the present exemplary embodiment the installer 205 determines whether the letter "C" is included in the product specifying information in the same manner as in the MFP/SFP determination. In this determination as well, the determination can be made based on some other information from the printing apparatus, or based on the series name included in the product specifying information.

If it is determined that the printing apparatus has a color function (YES in step S8007), then in step S8008, the installer 205 registers the printing apparatus as a color printer. If it is determined that the printing apparatus does not have a color function (NO in step S8007), then in step S8017, the installer 205 registers the printing apparatus as a monochrome printer. Next, in step S8009, the installer 205 extracts the number portion in the product name included in the product specifying information. In step S8010, the installer 205 selects a shared printer driver for a printing apparatus having a number smaller than and closest to the extracted number from among the information in the management table in which MFP/SFP and monochrome/color information matches with the information of the printing apparatus. The processing of steps S8007 to S8010 specifies the category of a product to select a shared printer driver corresponding to the category. Then, the processing proceeds to step S8011.

In step S8011, the installer 205 determines whether the processing for all of the models has been completed. If the installer 205 determines the processing for all of the models has not been completed, then, the processing proceeds to step S8003. As described above, if a plurality of printing apparatuses are connected to the host computer, for all the product specifying information, the installer 205 repeats the processing starting with step S8003. If the processing for all of the models has been completed (YES in step S8011), then the processing proceeds to step S8012.

In the present exemplary embodiment, for "3050", the similar shared printer driver to that for "3000", which is smaller than and closest to "3050", is selected. This estimation is based on an empirical rule where, usually, the model name of similar models is gradually increased for newer models.

In step S8012, as illustrated in the UI example illustrated in FIG. 7, the installer 205 displays the selected results to a user, so that the user can change the shared printer driver. In step S8013, the installer 205 waits for the user to make a selection. Once the user selects the "Determined" button (YES in step S8013), then in step S8014, the installer 205 installs the shared printer driver assigned to and determined for the searched printing apparatus on the host computer 3000.

If the determined content is not listed in the management table, then in step S8015, the installer 205 changes (adds/corrects) the management table to reflect the determined content therein. When performing the next determination, the installer 205 performs a determination for a suitable shared printer driver based on the changed information in the management table. Then, the processing ends. From the next time onwards, the installer 205 performs the selection processing in step S8010 using the changed management table.

As described above, the amount of work for providing a dedicated printer driver to each printing apparatus can be decreased by preparing a plurality of shared printer drivers and assigning the optimum shared printer driver thereto based on the product information. Further, even for a new printing apparatus that is not recognized on the printer driver side, the amount of maintenance work can also be decreased by determining the optimum shared printer driver based on the information obtained from the printing apparatus.

Broadly divided, printing apparatuses can be classified depending on whether they can perform color printing, whether they have a management function, whether they have a staple function, and whether they have a binding function. Therefore, shared printer drivers with combinations of these basic functions are prepared in advance to automatically determine an optimum shared printer driver for each product. As a method for specifying a product to be used, product specifying information specific to a product obtained during the search for printing apparatuses connected to a network is used.

The above technological principle is basically as follows. The functions of various models are divided up into respective common functions, and a shared driver is designed for each product category.

Product names (product specifying information) are given for each product category so as to be easily understood. If a product is already designed in such a manner, it is easy to use that product name. For example, a color MFP is given a name that includes "C" and "MFP". Further, the range of numbers in each of series for a higher-level model with a higher-level function, for example, with an option, and a lower-level model without the option is defined after rearranging the range of numbers therefor. Thus, by defining the numbers in order, even if a new product is released afterwards, it is not necessary to re-release an installer for the new product. This is because a suitable shared printer driver can be estimated using the product specifying information and the management table.

The installation software for installing the printer driver manages the combination of the product specifying information and the shared printer driver, and the applicable shared printer driver is installed. Since the main purpose of the installation method of the shared printer driver according to the present exemplary embodiment is to decrease the amount of printer driver maintenance work, there is a need for a scheme that can handle future products as well. Therefore, in preparation for a case where there is no listing of the product in the management table managed by the installer, a scheme for estimating and specifying from product specifying information is provided. Obviously, other information can be obtained from the printer, and the printing functions can be specified from the information. Further, the estimated results are shown to a user and can be changed by the user so that the estimated results can be corrected if there is an error in them. The determined contents are added to the management table, so that from the next time the determination is made based on the new management table, and not on estimation. Further, by allowing this management table to be edited or replaced, and by only preparing a management table in conjunction with a product, the printer driver will be compatible with the OS of that system.

The processing illustrated in FIG. 8 according to the present exemplary embodiment is executed by a host computer using a program and an installer which are externally installed. Further, in such a case, the present invention is applicable to cases where information groups including a program are supplied to a host computer by a recording medium, such as a compact disc ROM (CD-ROM), a flash memory, or an FD, or from an external recording medium via a network.

Thus, the present invention can be achieved by supplying a storage medium storing software program code for realizing the functions of the present exemplary embodiment to a system or an apparatus, or downloading the software program code from an external server (not illustrated), so that the program code stored in the storage medium or the downloaded program code can be read and executed by a computer (CPU or MPU) of the system or apparatus.

In this case, the program code itself read from a storage medium realizes the novel function of the exemplary embodiment of the present invention, so that the storage medium storing the program code constitutes the present invention. Examples of the storage medium for supplying the program code include floppy disks, hard disks, optical disks, magneto-optical disks, digital versatile discs (DVDs), CD-ROMs, magnetic tapes, non-volatile memory cards, ROMs, electrically erasable ROMs (EEPROMs), and the like.

Further, the present invention includes cases where the functions of the exemplary embodiment are realized by executing program code which is read by a computer. In addition, the present invention also includes cases where the operating system (OS) or the like that is running on the computer performs all or part of the actual processing based on an instruction of the program code, so that the functions of the exemplary embodiment are realized by such processing. Further, the present invention also includes a case where program code read from a storage medium is written into a memory that is provided on a function expansion board inserted into a computer or a function expansion unit connected to the computer. Then, based on an instruction from that program, a CPU provided on the function expansion board or function expansion unit performs all or part of the actual processing, so that the functions of the exemplary embodiment are realized.

As described above, the external memory 11 stores shared printer drivers classified into product categories each including a plurality of models and a plurality of pieces of correspondence information between those shared printer drivers and models.

Further, the installer 205 stored in the external memory 11 acquires product specifying information for specifying a printing apparatus from the printer 1500.

Even if a printer driver corresponding to the product specifying information acquired by the installer 205 is not included in the management table, a product category corresponding to the product specifying information can be determined using the management table (FIG. 6) stored in the external memory 11. Two genres illustrated in part 3002 of FIG. 3 can be given as an example of product categories. Specific examples include the product categories listed in the far-left column illustrated in FIG. 4. For example, the monochrome SFP illustrated in FIG. 4 is a product category. The examples listed in the far-left column of FIG. 4 are product categories. The management table is an example of the correspondence information.

Further, the installer 205 determines a shared printer driver corresponding to the product category based on the management table.

The installer 205 performs setup of the host computer 3000 using the determined shared printer driver.

These processes are executed by the host computer 3000, which is an example of an information processing apparatus.

As illustrated in FIG. 4, the shared printer driver can also include a color printer or monochrome printer function, a department management function, and a finishing function including a staple function.

Further, it is desirable to allow products to be added, or the shared printer driver corresponding to a product to be changed, by allowing the management table stored in the HD to be edited.

In FIG. 8, the installer 205 determines whether the printing apparatus is an SFP, an MFP, a color printer, or a monochrome printer, and determines a driver (step S8010). The installer 205 can be configured to determine the shared printer driver by determining, based on the product specifying information, whether color printing can be performed, or whether a department management function is provided, or whether a sorting function is provided.

The installer 205 can display the determination results on the CRT 10 to enable the user to change the shared printer driver (FIG. 7).

Further, if the shared printer driver is determined by the installer 205, it is desirable to add the correspondence between such determined shared printer driver and the product specifying information acquired by the installer 205 to the management table stored in the external memory 11.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-283543 filed Oct. 31, 2007, which is hereby incorporated by reference herein in its entirety.

What is claimed is:

1. An information processing apparatus comprising:
a storage unit configured to store pieces of correspondence information between a shared printer driver for controlling a plurality of printing apparatuses and product specifying information for specifying the plurality of printing apparatuses, wherein the storage unit stores the correspondence information about a plurality of shared printer drivers and each of the plurality of shared printer drivers corresponds to each of a plurality of product categories categorized by common functions among the plurality of printing apparatuses;
an acquisition unit configured to acquire product specifying information and function information from a printing apparatus;
a first determination unit configured to determine a product category which includes the acquired function information as one of the common functions, when correspondence information including the acquired product specifying information is not stored by the storage unit;
a second determination unit configured to selectively determine a shared printer driver from the plurality of shared printer drivers based on the product category determined by the first determination unit and a product name included in the acquired product specifying information; and
a setup unit configured to perform setup using the shared printer driver determined by the second determination unit.

2. The information processing apparatus according to claim 1, wherein the shared printer driver controls any one or more of functions among a color printer function, a monochrome printer function, a department management function, and a finishing function including a staple function.

3. The information processing apparatus according to claim 1, wherein, when the correspondence information including the acquired product specifying information is stored by the storage unit, the second determination unit is configured to determine the shared printer driver based on the product specifying information.

4. The information processing apparatus according to claim 1, further comprising a display unit configured to display a screen for indicating the determination result by the second determination unit and to allow the shared printer driver to be changed.

5. The information processing apparatus according to claim 1, wherein, when the correspondence information including the acquired product specifying information is not stored by the storage unit, the storage unit is configured to add and store a correspondence between the shared printer driver and the acquired product specifying information to the correspondence information stored according to the determination result by the second determination unit.

6. A method for information processing, the method comprising:
storing pieces of correspondence information between a shared printer driver for controlling a plurality of printing apparatuses and product specifying information for specifying the plurality of printing apparatuses, wherein storing comprises storing the correspondence information about a plurality of shared printer drivers and each of the plurality of the shared printer drivers corresponds to each of a plurality of product categories categorized by common functions among the plurality of printing apparatuses;
acquiring product specifying information and function information from a printing apparatus;
determining a product category which includes the acquired function information as one of the common functions, when correspondence information including the acquired product specifying information is not stored;
selectively determining a shared printer driver from the plurality of shared printer drivers based on the determined product category and a product name included in the acquired product specifying information; and
performing setup using the determined shared printer driver.

7. The method according to claim 6, wherein the shared printer driver controls any one or more of functions among a color printer function, a monochrome printer function, a department management function, and a finishing function including a staple function.

8. The method according to claim 6, further comprising determining, when the correspondence information including the acquired product specifying information is stored, the shared printer driver based on the product specifying information.

9. The method according to claim 6, further comprising displaying a screen for indicating the determination result, and allowing the shared printer driver to be changed.

10. The method according to claim 6, further comprising adding and storing, when the correspondence information including the acquired product specifying information is not stored, a correspondence between the shared printer driver and the acquired product specifying information to the stored correspondence information according to the determination result.

11. A non-transitory computer-readable storage medium storing a control program that, when executed by a computer, causes the computer to perform operations comprising:
storing pieces of correspondence information between a shared printer driver for controlling a plurality of printing apparatuses and product specifying information for specifying the plurality of printing apparatuses, wherein storing comprises storing the correspondence information about a plurality of shared printer drivers and each of the shared printer drivers corresponds to each of a plurality of product categories categorized by common functions among the plurality of printing apparatuses;
acquiring product specifying information and function information from a printing apparatus;
determining a product category which includes the acquired function information as one of the common functions, when correspondence information including the acquired product specifying information is not stored;

selectively determining a shared printer driver from the plurality of shared printer drivers based on the determined product category and a product name included in the acquired product specifying information; and performing setup using the determined shared printer driver.

* * * * *